United States Patent Office 3,423,364
Patented Jan. 21, 1969

3,423,364
POLYFLUOROCARBON OXIDES PREPARED FROM A MIXTURE OF A POLYFLUORO CARBONYL COMPOUND, A PERFLUORO-OLEFIN AND OZONE
Nicholas Kowanko, Minneapolis, Minn., assignor to Minnesota Mining and Manufacturing Company, St. Paul, Minn., a corporation of Delaware
No Drawing. Filed Feb. 7, 1966, Ser. No. 525,325
U.S. Cl. 260—63                                    15 Claims
Int. Cl. C08g 15/00; C08g 23/00; C07c 43/12

ABSTRACT OF THE DISCLOSURE

Process for producing polyfluorocarbon oxides in which a mixture of polyfluorocarbon carbonyl compound, e.g. perflurocarbon ketones or carboxylic acid fluorides, and perfluoroolefin is subjected to the action of ozone at a temperature in the range of about 20° C. to −160° C., to form polyfluorocarbon oxides which have terminal carboxyl or acyl fluoride groups. The products are useful by virtue of the reactive terminal groups, or, if treated to remove said groups, are useful as inert liquid heat transfer media.

---

This invention relates to new and very useful processes for reacting ozone with perfluoroolefins and perfluorocarbon carbonyl compounds, to polyfluorocarbon oxides resulting therefrom, and to new and useful products made therefrom.

Polyfluorocarbon oxides are fluorine-containing polymeric materials which characteristically contain ether linkages in their molecular backbones. The carbon atoms are joined to each other, to oxygen atoms, and/or to fluorine atoms. Usually no appreciable amounts of hydrogen are present in such polymers.

Heretofore, it has been discovered that perhaloolefins react with ozone to yield polyhalocarbon oxides.

I have now discovered that fluorocarbon carbonyl compounds in combination with perfluoroolefins react with ozone giving rise to polyhalocarbon oxides having significantly modified structure and properties. The mechanism for entry by the perfluorocarbon carbonyl compound into this polymerization process is unknown. This invention provides a convenient one-step synthesis for making polyfluorocarbon oxides and does not require the use of light or relatively expensive starting materials.

More specifically, my invention is directed to the process of introducing ozone into a reaction zone containing a liquid phase mixture of perfluoroolefin and perfluorocarbon carbonyl compound. Oxygen ($O_2$) can optionally be present. My invention is also directed to the polymers obtained from such process; these polymers are substantially free of oxidizing linkages containing in all cases not more than about 0.1 equivalent per gram of oxidizing linkages, and in most cases less than 0.05 equivalent per gram, as determined by standard idiometric analysis.

In one aspect, this invention is directed to a process for the preparation of polyfluorocarbon oxide polymers.

In another aspect, this invention is directed to the novel polyfluorocarbon oxide polymers made by the afore-indicated process.

In another aspect, this invention is directed to novel hydrolyzed polyfluorocarbon oxide polymers derived from the products of the afore-indicated process.

In another aspect, this invention is directed to novel cured polyfluorocarbon oxide polymers derived from the products of the afore-indicated process.

Another object is to provide a process for reacting ozone with perfluoroolefins in admixture with perfluorocrabon carbonyl compounds, to produce polymeric products.

Another object is to provide new classes of polymers from such polyfluorocarbon oxide polymers by hydrolyzing, by stabilizing, and by curing same.

Other objects and advantages of the present invention will become apparent to those skilled in the art from the accompanying description and disclosure.

In practicing the process of this invention three classes of starting material are necessarily employed.

One of the three classes of starting material are perfluoroolefins. Preferably each perfluoroolefin molecule contains from about 2 through 15 carbon atoms. A more preferred class of perfluorinated olefins are those containing from 3 through 6 carbon atoms. A most preferred perhaloolefin is perfluoropropene. The perfluoroolefin can be derived from any conventional source.

A second class of starting material used in practicing the process of this invention are perfluorocarbon carbonyl compounds. A preferred class of perfluorocarbon carbonyl compounds are polyfluorocarbon ketones containing from 3 to 15 carbon atoms. Another preferred class of perfluorocarbon carbonyl compounds are carboxylic acid fluorides. A more preferred ketone is perfluoroacetone. A more preferred acid fluoride is perfluorobutyryl fluoride.

The third class of starting material used in practicing the process of this invention is a reagent mixture containing as the essential active (reactive) component at least about 0.001 weight percent ozone (based on total reagent mixture weight). This reagent mixture prior to being used in the process of this invention can be in the gas phase, in the liquid phase, or can constitute a combination thereof. The ozone can be derived from any conventional source. Oxygen can be optionally present in this reagent mixture.

Each class of starting material can be dispersed in an inert carrier or in a reactive carrier. By the term "inert," reference is had to a material which does not react with either the first class or the second class of starting material, and which does not appreciably inhibit the formation of the reaction products under the process conditions used. By the term "reactive," reference is had to a material (e.g. gas or liquid) which reacts with either the first class, second class, or third class of starting material under the conditions in which the process of this invention is carried out. By the term "carrier," reference is had to a diluent (either in gas phase or liquid phase) which, if a liquid, forms a single-phase material with ozone, and which does not appreciably inhibit reaction between the first class or the second class of starting material when practicing the process of this invention.

In general, the process of this invention proceeds by first blending the starting materials of both the first and second class together and then contacting the resulting mixture in a liquid phase with the third class of starting material (e.g. ozone) so that a polymerization reaction results. The starting materials of the first and second class are generally present in a molar ratio ranging between 1 and 0. A more preferred molar ratio ranges between 1 and 0.05. A most preferred molar ratio ranges between 0.2 and 0.05.

This reaction is highly exothermic, one consequence of which is that it is desirable to limit the maximum quantity of unreacted ozone present in a reaction zone at any given time relative to the total amount of perfluoroolefin and perfluorocarbon carbonyl compound present to a level which will prevent excessive, even explosive, rates of reaction from occurring. The process can be practiced either batchwise or continuously.

When practicing the process, it is preferred to avoid the presence of readily oxidizable materials, such as hydrocarbon grease, hydrogen-containing solvents, and the like, all of which would preferentially be attacked by the ozone, resulting in production of undesirable by-products, excessive consumption of ozone, and even the hazard of explosion. Compounds having high free radical chain transfer constants, e.g. $CCl_4$, $CHCl_3$, isobutane, and the like, are especially to be avoided.

The mixture of perfluoroolefin and perfluorocarbon carbonyl compound is maintained in liquid phase when practicing the process, so reaction temperatures are usually below about 20° C., particularly when operating under atmospheric pressures. Commonly temperatures below about −20° C. are employed, and a preferred temperature range is from about −28° C. to −126° C., though temperatures as low as about −160° C. can be used. However, at these lower temperatures, the rate of reaction may be retarded to an extent such that rate of reaction is impractically or uneconomically slow.

Although it is convenient to operate at substantially amospheric pressure, subatmospheric or superatmospheric pressures can be used.

If oxygen is present when the mixture of starting material of the first and second class (e.g. perfluoroolefin and perfluorocarbon carbonyl compound) is contacted with starting material of the third class (e.g. ozone) it is at least in part consumed, and so apparently enters into the reaction.

Under the conditions (i.e. temperature and pressure) employed in the process of this invention, starting materials of the first and second class do not react with one another until the material of the third class (e.g. ozone) is introduced.

The minimum contact time between the mixture of the first and second classes of starting materials and the third class of starting material needed for polymerization can vary, but is affected by the temperatures of the reactants, the manner in which contact between the starting materials is effected, the nature of the perfluoroolefin and carbonyl compound employed, and similar factors. For example, when operating the process continuously it is generally convenient, though not necessary, to employ a reaction zone temperature which will produce rapid and smooth reaction between ozone and mixture of olefin and carbonyl compound, rather than using either a low reaction zone temperature which requires excessively long contact times to produce reaction, or a reaction zone temperature which causes a reaction to proceed excessively rapidly (e.g. explosively and uncontrollably). Optimum reaction zone temperatures for a given process embodiment vary, depending on a number of considerations, such as equipment construction, reactant feed rates, pressure, contact area between reactants, and the like. When operating the process continuously, it is desirable to regulate both the reaction zone temperature and the rate of ozone input so that an excessive build-up in the reaction zone of a concentration of unreacted ozone is avoided. Such an excessive build-up is evidenced by the fact that the reaction becomes difficult to control.

In one mode of practicing this invention, a gaseous reagent mixture containing ozone in a concentration of preferably at least about 0.001 weight percent (based on total gas mixture) is introduced into a reaction zone containing a mixture of perfluoroolefin and perfluorocarbon carbonyl compound maintained in liquid phase. Preferably, this mixture is maintained at a temperature not above its boiling point. The ozone can be admixed with oxygen ($O_2$) or an inert gas. Examples of inert gases include the noble gases in Group O of the Periodic Table (long form) or nitrogen. One suitable gas mixture is that known as "ozonized air" which is produced commercially by passing air through conventional ozonization apparatus and producing a gas stream typically containing about 1 to 2 weight percent ozone. It is preferred to utilize gaseous reagent mixtures wherein the ozone concentration is above about 1 weight percent, and still more preferably is between about 2 and 5 weight percent. In such preferred ozone containing reagent mixtures the balance can be up to 100 weight percent oxygen. Below such concentrations, the rate of product production tends to be excessively slow while above such concentrations, the rate of reaction becomes difficult to control, other process variables being constant. Such reaction is conducted at about −25 to −35° C. for a period of time sufficient to produce polyfluorocarbon oxides.

In addition, the perfluorocarbon carbonyl compound enters into the reaction, and provides a tool for modifying and controlling the physical and chemical properties of the polyfluorocarbon oxide through the incorporation of the elements of the perfluorocarbon carbonyl compound into the polyfluorocarbon oxide product.

The polyfluorocarbon oxide products of this invention range from water-white mobile liquids, to oils, to semi-solid greases. Characteristically, these polyfluorocarbon oxides are reactive materials which contain base-titrable functional groups. In the new polymer as obtained directly from the polymerization process of this invention these functional groups are characteristically (—COF) groups, as detected by infrared analysis. Owing to the presence of adventitious moisture which can hydrolyze the (—COF) groups to (—COOH) groups, the presence of the latter in the polymer obtained directly from the process of this invention is detected by infrared analyses.

As will be discussed more fully below, it is frequently desirable to deliberately hydrolyze all (—COF) groups to (—COOH) groups, or to remove all functionality by thermal or chemical treatment preparatory to utilization of the polymeric product of this invention.

The viscosity of a polyfluorocarbon oxide product obtained appears to be influenced by the concentration of ozone employed initially in the reagent mixture.

We have observed that, when one increases the concentration of ozone in a reagent mixture, other process conditions being maintained substantially constant, one tends to obtain certain characteristic changes, such as:

(a) Decreases in average molecular weight of the product polymers, and (b) Increases in the rate of reaction.

On the other hand, when one decreases the amount of ozone in a starting reagent mixture, other process conditions being maintained substantially constant, one tends to obtain certain characteristic changes, such as:

(a) Increases in the molecular weight of the product polymers, and (b) Decreases in reaction rate.

In addition, the viscosity of the polyfluorocarbon oxide product of this invention appears to be influenced by the choice of fluorocarbon carbonyl compound (starting material Class 2) employed in conjunction with a perfluoroolefin (starting material Class 1) such as perfluoropropene.

Generally, when a perfluorocarbon acid fluoride (e.g. perfluorobutryl floride) is employed, the product molecular weight distribution is lower than is the case where a perfluoroketone (e.g. perfluoroacetone) is employed. In the latter case, the higher molecular weight product obtained also appears to have a greater tendency toward reactivity due to the introduction of reactive groups into the polymeric structure.

The polyfluorocarbon oxides of this invention characteristically have molecular weights from 500 to 100,000. Lower molecular weights are estimated from ebullioscopic information. Higher molecular weights are estimated by comparing the bulk viscosities compared with those of known $CF_3NO/C_2F_4$ copolymers for which representative MW values have been determined from light scattering data.

$F^{19}$ n.m.r. spectra of the polyfluorocarbon oxides of this invention show principal bands at 53, 55, 58, 75, 80, 86, 90 and 145 $\phi*$. Some of these bands are characteristic of (—CF(CF$_3$)CF$_2$—O—) and (—CF$_2$—O—)

groups, and therefore establish the presence of the fluorocarbon oxide linkages in the polymer backbone. However, because the perfluorocarbon carbonyl compounds render the polyfluorocarbon oxide polymers more complex than when such compounds are not used to make such polymers, specific structural assignments on the basis of n.m.r spectra are not now made.

Infrared spectroscopy finds only limited application in the structure determination of the polyfluorocarbon oxides of this invention, but is effective in establishing the presence of certain groupings, such as, for instance, (—COOH), or (—COF) groupings in a polymer, and in establishing close structural similarity between two samples. Just as the identity of the infrared spectra of two pure compounds denotes their identity, so the close similarity of the infrared spectra of two polymers denotes their close structural similarity. Infrared spectrum can be determined on about 1–5 mg. of sample, and is thus less limited by sample size. As indicated above, infrared spectral analysis has been used to establish the presence of (—COF) and small amounts of (—COOH) groups in the polymer produced by the process of this invention.

The products of this invention can be used directly (as described below) or can be hydrolyzed. Hydrolysis can be accomplished simply by repeatedly washing a polyfluorocarbon oxide polymer with liquid water at room temperature until the wash water no longer contains fluoride ion. Heat may be employed to promote this hydrolysis reaction. The hydrolyzed product is conveniently dried under reduced pressure to remove excess water.

The process of the present invention, the polyfluorocarbon oxide products produced thereby, and the hydrolyzed products derived therefrom are now illustrated by the following non-limitative examples. It will be appreciated that in the examples, on the basis of the available $F^{19}$ n.m.r and infrared spectroscopic data, and except for a change both in the functional end groups and in the labile end sequences, a backbone polymer structure is substantially unaltered by hydrolysis.

EXAMPLE 1

A gaseous mixture comprising $O_2$ (95–98%) and $O_3$ (2–5%), prepared by passing oxygen through an electric discharge, is bubbled slowly (0.01–0.02 cu. ft./min.) through a refluxing mixture of n-perfluorobutyryl fluoride (1.2 ml.) and perfluoropropene (6 ml.) in a borosilicate glass vessel provided with an efficient Dry Ice (solid $CO_2$) condenser. The reaction mixture is thus maintained at a temperature of about —30° C. A vigorous reaction is observed in this instance within two minutes of the time of the introduction of ozone into the n-perfluorobutyryl fluoride-perfluoropropene mixture.

The onset of this reaction is evidenced by evolution of heat and of gases which fume in air (analysis shows the evolved gases to contain $COF_2$, $CF_3COF$, and other unidentified compounds), and by rapid uptake of the incoming gases by the reaction mixture. After about 50 minutes the reaction subsides and reflux stops. A product (oil, 0.1–0.2 ml.) remains after vacuum stripping at $10^{-4}$ mm. Hg to remove and separate the more volatile components which are largely of low molecular weight and examined separately.

The product oil is washed by shaking with 1 ml. distilled water. After separating the water is found to contain fluoride ion.

The $F^{19}$ n.m.r. spectrum of the water-washed polymer in $CFCl_3$ shows the presence of the following bands: 11–14 (V.W.); 53 (W.); 55 (M); 57–9 (W.); 75 (W.); 80 (S); 86–9 (W., broad); 134–7 (V.W. broad); 145 (W.), where (V.W.) stands for very weak; (W.) stands for weak; (M) stands for medium; (S) stands for strong and (VS) stands for very strong bands of the particular chemical shift.

In the above case the spectrum is complex with small unassigned peaks.

Typically, the fluorine atoms of (—OCOF) end groups give rise to bands in the region 11–14 $\phi^*$. The fluorine atoms of (—$CF_2$—O—), ($CF_3$—O—), and like groups, give rise to bands in the region 53–59 $\phi^*$.

The n.m.r spectrum clearly indicates the pressure of a complex polyfluorocarbon oxide chain structure incorporating perfluorobutyryl fluoride.

The infrared spectrum gives absorption maxima at 5.6, 7.6–9.5, 10.2, and 13.4$\mu$, indicating the presence of COOH, C–F, and C–$CF_3$ groups. The overall appearance of the spectrum, especially in the intense 7.6–9.5$\mu$ region, further demonstrates that the structure of the polymer has been modified by the presence of perfluorobutyryl fluoride.

EXAMPLE 2

The procedure of Example 1 is repeated, except that a mixture of perfluoropropene (10 ml.) and hexafluoroacetone (1 ml.) is substituted for perfluoropropene alone. The reaction is complete after one hour, and reflux stops. The product is an opaque, mobile liquid which is stripped in vacuo to separate more volatile components. The residue is a colorless solid (ca. 0.5 g.) which yellows rapidly on standing even in the absence of air. This residue is water washed and hydrolyzed by repeated stirring with water until the wash water no longer shows the presence of fluoride ion.

The wash product is a milky colorless solid polymeric material of estimated molecular weight 120,000.

The $F^{19}$ n.m.r. spectrum of this material is complex but like that of Example 1 indicates the presence of polyfluorocarbon oxide structure.

Th infrared spectrum of this residue has absorption maxima at 5.5, 5.6, 5.9, 7.6–9.6 and 10.2$\mu$, in addition to weak maxima at 12.4, 13.4, and 13.8$\mu$. Liquid water as an impurity is probably present, as evidenced by broad OH absorption at 2.9$\mu$, and weak maxima at 3.4–3.5$\mu$, and 6.9–7.2$\mu$ are assigned to aliphatic CH (from hydrocarbon grease contaminant). The significant maxima are assigned to —COOH and C=C (5.5, 5.6); C=O at 5.9; C–F at 7.6–9.6, and C–$CF_3$ at 10.2$\mu$. The relative intensities of these maxima indicate that hexafluoroacetone units are incorporated into the basic polymer structure.

In general, the polyfluorocarbon oxides and the hydrolyzed products derived therefrom which are prepared according to the processes of this invention and illustrated by Examples 1–2 above are useful as intermediates for the manufacture of the following two classes of products:

(1) Stabilized materials, especially liquids, useful, for instance, as heat transfer media or lubricants, and (2) Cured materials and curable formulations, useful, for instance, in sealant systems and adhesive systems, and as elastomeric materials of construction, particularly where high temperature serviceability in corrosive environments is required.

What I claim is:

1. A process for producing polyfluorocarbon oxides comprising introducing ozone into a reaction zone containing a perfluorocarbon carbonyl compound having from 3 to 15 carbon atoms, of the group consisting of perfluorocarbon ketones and perfluorocarbon carboxylic acid fluorides, and a perfluoroolefin having from 2 to 15 carbon atoms, at a temperature in the range of about 20° C. to —160° C.

2. A process for producing polyfluorocarbon oxides comprising contacting a reagent mixture containing at least about 0.001 weight percent ozone with a liquid phase mixture comprising perfluorocarbon carbonyl compound having from 3 to 15 carbon atoms, of the group consisting of perfluorocarbon ketones and perfluorocarbon carboxylic acid fluorides, and a perfluoroolefin having from 2 to 15 carbon atoms in a molar ratio in the range of 1 to 0.05 at a temperature in the range of about 20° C. to −160° C. for a period of time sufficient to produce polyfluorocarbon oxides.

3. The process of claim 2 wherein atmospheric pressures and temperatures ranging from about −20 to −160° C. are employed.

4. The process of claim 2 wherein said perfluoroolefin contains from 3 through 6 carbon atoms.

5. The process of claim 2 in which the molar ratio of perfluorocarbon carbonyl compound to perfluoroolefin in the starting reaction mixture is not less than 0.2.

6. The process of claim 2 in which the molar ratio of perfluorocarbon carbonyl compound to perfluoroolefin in the starting reaction mixture is not greater than 1.

7. The process of claim 2 wherein said perfluorocarbon carbonyl compound is a carboxylic acid fluoride.

8. The process of claim 2 wherein said perfluorocarbon carbonyl compound is a ketone.

9. The process of claim 2 wherein said perfluorocarbon carbonyl compound is n-perfluorobutyryl fluoride.

10. The process of claim 5 wherein said perfluorocarbon carbonyl compound is perfluoroacetone.

11. A process for producing polyfluorocarbon oxides comprising contacting at −25 to −35° C. a liquid mixture comprising perfluoropropene and polyfluorocarbon carbonyl compound in which the molar ratio of polyfluorocarbon carbonyl compound to perfluoropropene ranges between 0.2 and 0.05 with a gaseous reagent mixture comprising between about 2 and 5 weight percent ozone and the balance up to 100 weight percent oxygen for a period of time sufficient to produce polyfluorocarbon oxides.

12. The process of claim 11 in which the polyfluorocarbon carbonyl compound is perfluoroacetone.

13. The process of claim 11 in which the polyfluorocarbon carbonyl compound is n-perfluorobutyryl fluoride.

14. A polyfluorocarbon oxide product made by the process of claim 1, said product being characterized by
(a) containing hydrolyzable fluoride ion in terminal functional groups, and
(b) ranging in physical form from mobile water-white liquids to water-white semi-solids.

15. A polyfluorocarbon oxide product made by hydrolyzing a product of claim 14.

References Cited

UNITED STATES PATENTS 3,242,218  3/1966  Miller _____ 260—615
3,342,875  9/1967  Selman et al. _____ 260—615

WILLIAM H. SHORT, *Primary Examiner.*

L. L. LEE, *Assistant Examiner.*

U.S. Cl. X.R.
260—92.1, 615